United States Patent
Geering et al.

(10) Patent No.: US 9,189,180 B1
(45) Date of Patent: Nov. 17, 2015

(54) CONVERTING PAGE DESCRIPTION LANGUAGE TO ENHANCE THE CAPABILITIES OF MULTIFUNCTION PERIPHERALS

(71) Applicants: KABUSHIKI KAISHA TOSHIBA, Tokyo (JP); TOSHIBA TEC KABUSHIKI KAISHA, Tokyo (JP)

(72) Inventors: David L. Geering, Upper Hutt (NZ); Mitchell G. Marks, Collaroy (AU)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/449,790

(22) Filed: Aug. 1, 2014

(51) Int. Cl.
  *G06F 3/12* (2006.01)
  *H04N 1/00* (2006.01)

(52) U.S. Cl.
  CPC ............ *G06F 3/1206* (2013.01); *G06F 3/1238* (2013.01); *G06F 3/1247* (2013.01); *G06F 3/1248* (2013.01); *H04N 1/001* (2013.01); *H04N 2201/0094* (2013.01)

(58) Field of Classification Search
  CPC .............................. G06F 3/1285; G06F 3/1247
  USPC ........................ 358/1.15, 1.13; 726/4; 705/59
  See application file for complete search history.

(56) References Cited

U.S. PATENT DOCUMENTS

| | | | |
|---|---|---|---|
| 8,693,022 B2 | 4/2014 | Bhatia et al. | |
| 2003/0142335 A1 | 7/2003 | Oleinik et al. | |
| 2007/0053000 A1* | 3/2007 | Nakamura | 358/1.15 |
| 2010/0115633 A1* | 5/2010 | Ryu et al. | 726/31 |
| 2011/0128563 A1 | 6/2011 | Rupe et al. | |
| 2012/0274976 A1* | 11/2012 | Bhatia et al. | 358/1.15 |
| 2013/0174270 A1* | 7/2013 | Sugiura et al. | 726/26 |

OTHER PUBLICATIONS

Canon, Inc., Network Multi-PDL Printer kit-B1, Service Manual Revision 0, Mar. 2001, 61 pages, Japan.

\* cited by examiner

*Primary Examiner* — Jacky X Zheng
(74) *Attorney, Agent, or Firm* — SoCal IP Law Group LLP; Steven C. Sereboff; Jonathan P. Pearce

(57) ABSTRACT

A converter peripheral for converting an electronic document for output by a multifunction includes a network interface for receiving the electronic document, the electronic document in a page description language unsupported by the multifunction peripheral, a processor for accessing configuration data in order to determine at least one page description language supported by the multifunction peripheral, for accessing local license data to confirm authorization to perform a conversion, and for converting the electronic document into a page description language supported by the multifunction peripheral, and an output interface for transmitting the converted electronic document to the multifunction peripheral for output.

18 Claims, 12 Drawing Sheets

CONVERTING PAGE DESCRIPTION LANGUAGE TO ENHANCE THE CAPABILITIES OF MULTIFUNCTION PERIPHERALS

BACKGROUND

1. Field

This disclosure relates to peripherals for multifunction peripherals.

2. Description of the Related Art

A multifunction peripheral (MFP) is a type of document processing device which is an integrated device providing at least two document processing functions, such as print, copy, scan and fax. In a document processing function, an input document (electronic or physical) is used to automatically produce a new output document (electronic or physical).

Documents may be physically or logically divided into pages. A physical document is paper or other physical media bearing information which is readable unaided by the typical human eye. An electronic document is any electronic media content (other than a computer program or a system file) that is intended to be used in either an electronic form or as printed output. Electronic documents may consist of a single data file, or an associated collection of data files which together are a unitary whole. Electronic documents will be referred to further herein as documents, unless the context requires some discussion of physical documents, which will be referred to by that name specifically.

In printing, the MFP automatically produces a physical document from an electronic document. In copying, the MFP automatically produces a physical document from a physical document. In scanning, the MFP automatically produces an electronic document from a physical document. In faxing, the MFP automatically transmits via fax an electronic document from an input physical document, which the MFP has also scanned, or from an input electronic document, which the MFP has converted to a fax format.

MFPs are often incorporated into corporate or other organization's networks, which also include various other workstations, servers and peripherals. An MFP may also provide remote document processing services to external or network devices.

MFPs and printers typically receive documents for which physical document output is requested encoded with a page description language (PDL) in such a way that the physical document resulting from a print request very closely resembles (or exactly matches) the formatting of the electronic document received. PDL is a way of describing the content of a document along with the form it appears (font, position, emphasis, etc.). Images may also be incorporated, positioned, and sized within an electronic document and the associated PDL. The MFP or printer uses the PDL to generate print data, and it is the print data which is used at the electronic level to drive a print engine.

Typically, PDL is generated by a printer driver on a computer based upon the make and model of printer (or MFP) to which a print request is to be directed. Some printers and MFPs may be somewhat independent of print drivers—capable of accepting base document formats, such as Microsoft® Word® documents and outputting a physical document directly from that document without the use of an independent print driver. Still other formats, like bitmap and raster image formats closely akin to printer-native formats, may describe electronic documents in such a way that they natively describe the layout of the document.

Over time, new PDL formats have been devised and other PDL formats have become less-favored. For example, early PDL formats may have fewer options, require the transmission of more data to accomplish the same task or, otherwise, merely be deprecated to be replaced by a newer, similar PDL. Examples of various PDLs and raster image formats (for ease of reference, these will be referred to collectively as "PDLs" or "PDL formats" or "printable data streams") include printer control language XL (PCL XL), portable document format (PDF), (2) extensible paper specification (XPS), (3) Joint Photographic Experts Group (JPEG) format, (4) tagged image file format (TIFF), (4) portable network graphics (PNG) format, (5) printer command language 6 (PCL 6), (6) printer command language 5 (PCL 5) and (7) PostScript. The PDLs are distinct from computer formats such as Microsoft® Word® documents in that the electronic document formats are capable of being directly interpreted and output by printing devices capable of interpreting those formats without conversion to a more printer-friendly form.

Because PDL formats have evolved over time, older printers may or may not be capable of printing from some or all of the possible PDL formats. For example, an older printer may be capable of accepting PCL XL electronic documents and outputting a physical document. However, sending a JPEG or PCL 6 document to that same printer may have no effect or result in garbled document output. Likewise, lower-function printers may lack the ability to process certain PDL formats.

Throughout this description, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

DETAILED DESCRIPTION

MFPs or printing devices that support a limited number or even a single PDL format may be augmented with an intermediate converter peripheral. The converter peripheral may accept multiple PDL formats, convert incoming print requests including PDL formats unsupported by a target MFP or printing device, and output a PDL (or print stream) to the MFP or printing device in a supported format. All of this can take place without any additional print drivers being installed on the computer system requesting the print operation and without upgrading or otherwise altering the target MFP(s) or printing device(s). Before enabling conversion operations, the converter peripheral may confirm that it has an appropriate license key.

Description of Apparatus

Figure 1:
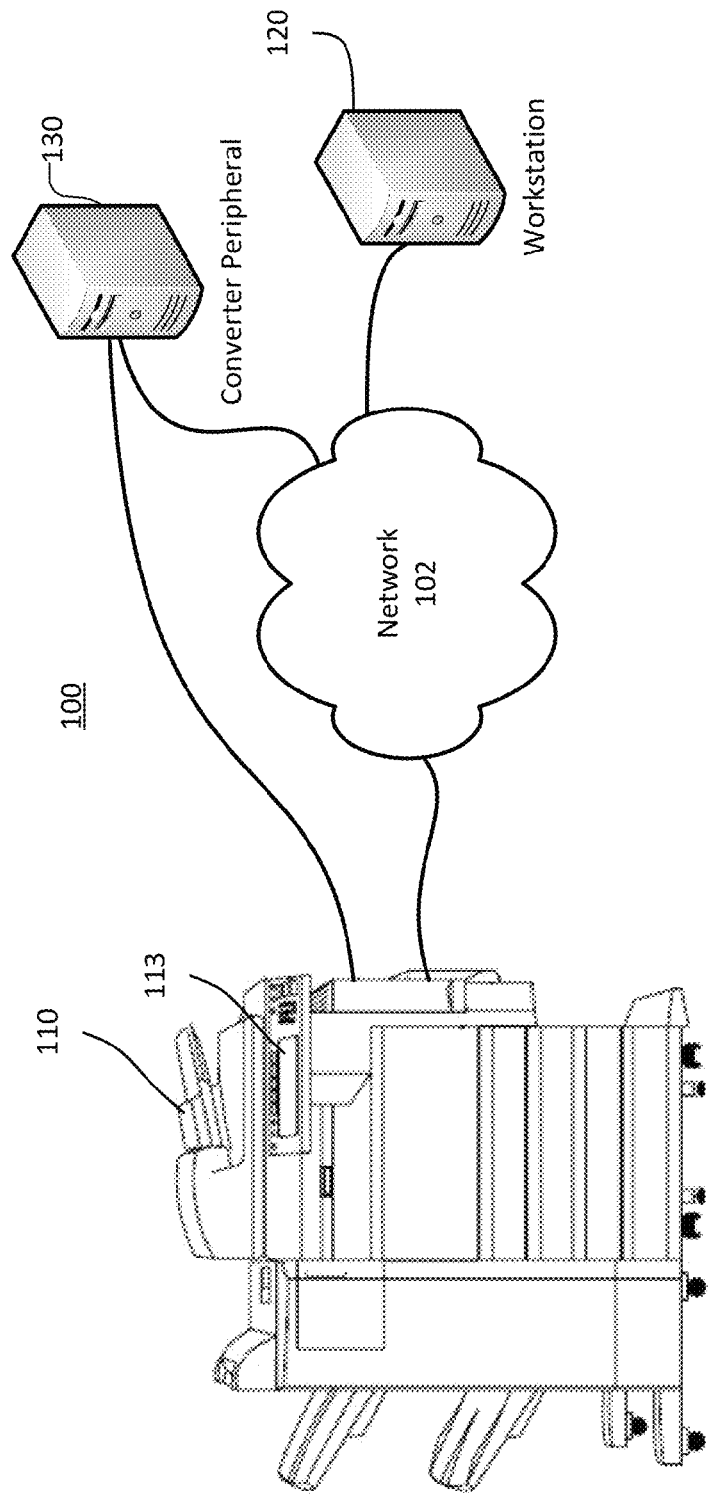
FIG. 1 is a diagram of an MFP system including a converter peripheral.

Referring now to FIG. 1 there is shown an MFP system 100. The system 100 includes an MFP 110, a workstation 120, and a converter peripheral 130, interconnected by a network 102. The system 100 may be implemented in a distributed computing environment and interconnected by the network 102. An MFP system 100 may include more than one MFP and more than one workstation 120.

The network 102 may be a local area network, a wide area network, a personal area network, a mobile or telephone network, the Internet, an intranet, or any combination of these. The network 102 may have physical layers and transport layers according to IEEE 802.11, Ethernet or other wireless or wire-based communication standards and protocols such as WiMAX, Bluetooth®, mobile telephone and data protocols, the public switched telephone network, a proprietary communications network, infrared, and optical.

The MFP 110 may be equipped to receive portable storage media such as USB drives. The MFP 110 includes a user interface subsystem 113, which communicates information to and receives selections from users. The user interface subsystem 113 has a user output device for displaying graphical elements, text data or images to a user and a user input device for receiving user inputs. The user interface subsystem 113 may include a touchscreen, LCD display, touch-panel, alphanumeric keypad and/or an associated thin client through which a user may interact directly with the MFP 110.

The workstation 120 is software operating on a computing device connected to the network 102. The workstation 120 is shown as a typical desktop computer, but may be or include a mobile device such as a mobile phone, tablet or handheld computer. For purposes of this patent, the workstation 120 is a computing device capable of outputting an electronic document for printing, the electronic document in a format that is not supported by the MFP 110.

The converter peripheral 130 is a computing device connected to the network 102 and, optionally, connected directly to the MFP 110. The computing device has appropriate software for providing the functionality described herein.

Figure 2:
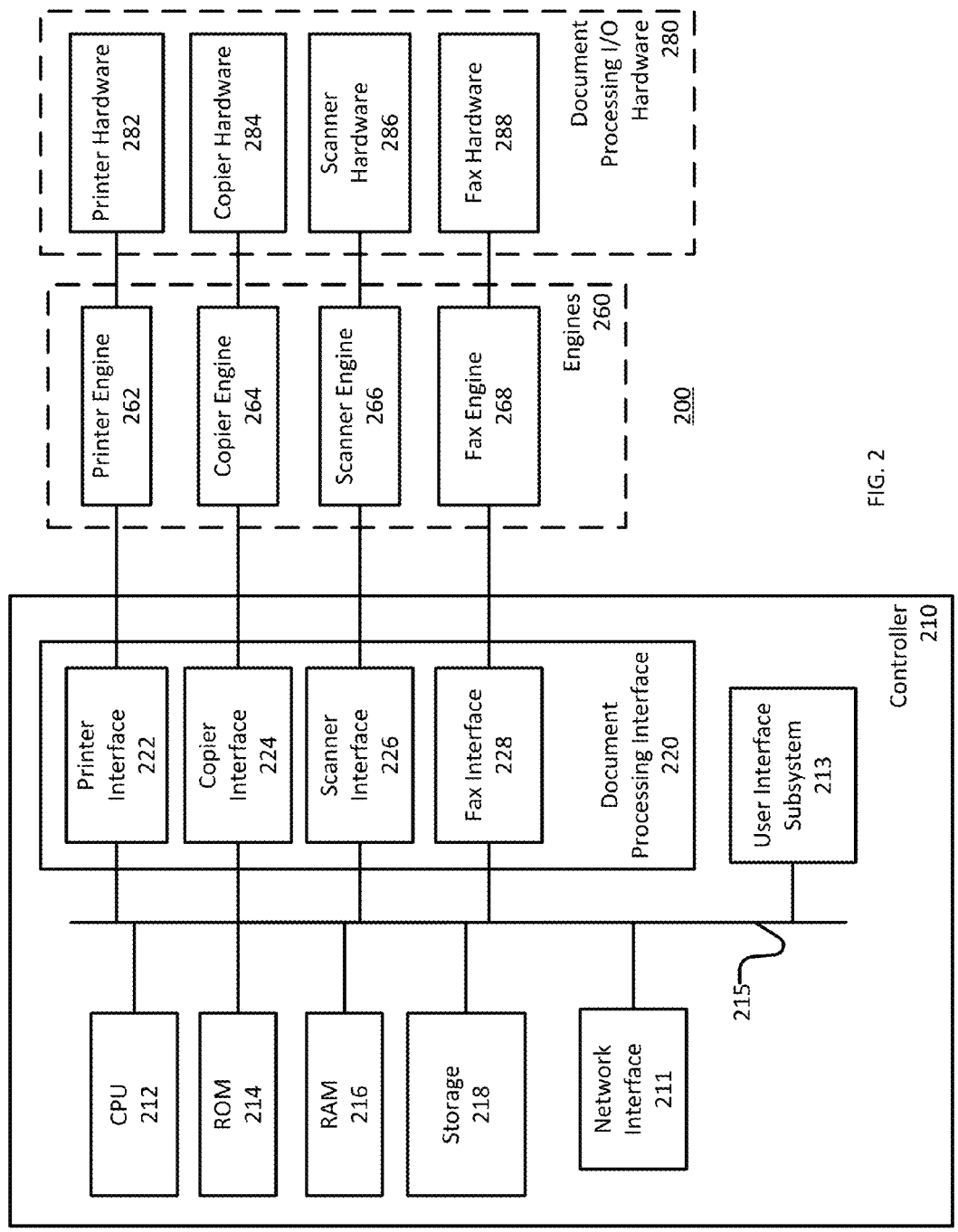
FIG. 2 is a block diagram of an MFP.

Turning now to FIG. 2 there is shown a block diagram of an MFP 200, which may be the MFP 110 (FIG. 1). The MFP 200 includes a controller 210, engines 260 and document processing I/O hardware 280. The controller 210 includes a CPU 212, a ROM 214, a RAM 216, a storage 218, a network interface 211, a bus 215, a user interface subsystem 213 and a document processing interface 220.

As shown in FIG. 2 there are corresponding components within the document processing interface 220, the engines 260 and the document processing I/O hardware 280, and the components are respectively communicative with one another. The document processing interface 220 has a printer interface 222, a copier interface 224, a scanner interface 226 and a fax interface 228. The engines 260 include a printer engine 262, a copier engine 264, a scanner engine 266 and a fax engine 268. The document processing I/O hardware 280 includes printer hardware 282, copier hardware 284, scanner hardware 286 and fax hardware 288.

The MFP 200 is configured for printing, copying, scanning and faxing. However, an MFP may be configured to provide other document processing functions, and, as per the definition, as few as two document processing functions.

The CPU 212 may be a central processor unit or multiple processors working in concert with one another. The CPU 212 carries out the operations necessary to implement the functions provided by the MFP 200. The processing of the CPU 212 may be performed by a remote processor or distributed processor or processors available to the MFP 200. For example, some or all of the functions provided by the MFP 200 may be performed by a server or thin client associated with the MFP 200, and these devices may utilize local resources (e.g., RAM), remote resources (e.g., bulk storage), and resources shared with the MFP 200.

The ROM 214 provides non-volatile storage and may be used for static or fixed data or instructions, such as BIOS functions, system functions, system configuration data, and other routines or data used for operation of the MFP 200.

The RAM 216 may be DRAM, SRAM or other addressable memory, and may be used as a storage area for data instructions associated with applications and data handling by the CPU 212.

The storage 218 provides volatile, bulk or long term storage of data associated with the MFP 200, and may be or include disk, optical, tape or solid state. The three storage components, ROM 214, RAM 216 and storage 218 may be combined or distributed in other ways, and may be implemented through SAN, NAS, cloud or other storage systems.

The network interface 211 interfaces the MFP 200 to a network, such as the network 102 (FIG. 1), allowing the MFP 200 to communicate with other devices.

The bus 215 enables data communication between devices and systems within the MFP 200. The bus 215 may conform to the PCI Express or other bus standard.

While in operation, the MFP 200 may operate substantially autonomously. However, the MFP 200 may be controlled from and provide output to the user interface subsystem 213, which may be the user interface subsystem 113 (FIG. 1).

The document processing interface 220 may be capable of handling multiple types of document processing operations and therefore may incorporate a plurality of interfaces 222, 224, 226 and 228. The printer interface 222, copier interface 224, scanner interface 226, and fax interface 228 are examples of document processing interfaces. The interfaces 222, 224, 226 and 228 may be software or firmware.

Each of the printer engine 262, copier engine 264, scanner engine 266 and fax engine 268 interact with associated printer hardware 282, copier hardware 284, scanner hardware 286 and facsimile hardware 288, respectively, in order to complete the respective document processing functions.

Figure 3:
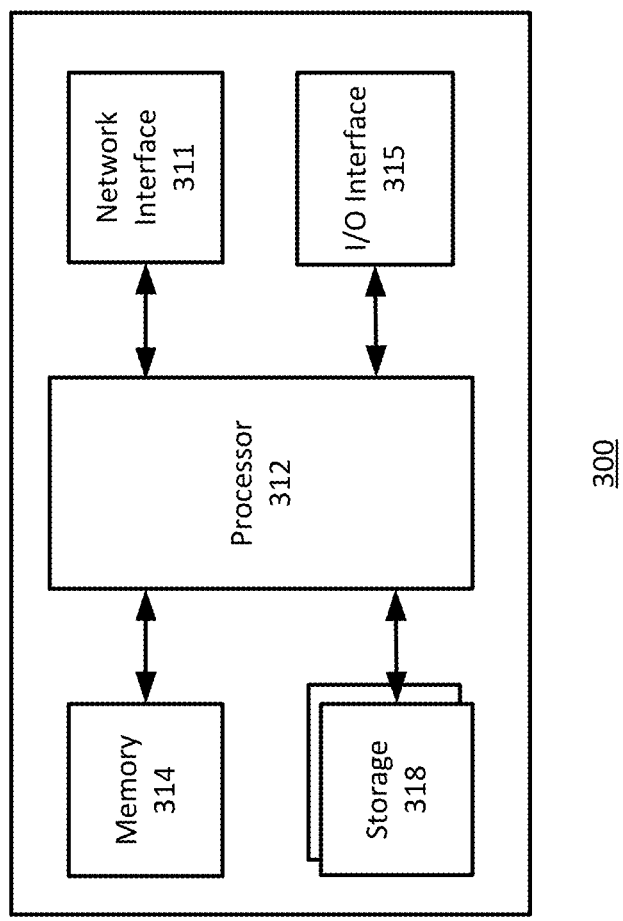
FIG. 3 is a block diagram of a computing device.

Turning now to FIG. 3 there is shown a computing device 300, which is representative of the server computers, workstation computers, client devices, mobile devices and other computing devices discussed herein. The controller 210 (FIG. 2) may also, in whole or in part, incorporate a general purpose computer like the computing device 300. The computing device 300 may include software and/or hardware for providing functionality and features described herein. The computing device 300 may therefore include one or more of: logic arrays, memories, analog circuits, digital circuits, software, firmware and processors. The hardware and firmware components of the computing device 300 may include various specialized units, circuits, software and interfaces for providing the functionality and features described herein.

The computing device 300 has a processor 312 coupled to a memory 314, storage 318, a network interface 311 and an I/O interface 315. The processor may be or include one or more microprocessors, application specific integrated circuits (ASICs), or systems on a chip (SOACs).

The memory 314 may be or include RAM, ROM, DRAM, SRAM and MRAM, and may include firmware, such as static data or fixed instructions, BIOS, system functions, configuration data, and other routines used during the operation of the computing device 300 and processor 312. The memory 314 also provides a storage area for data and instructions associated with applications and data handled by the processor 312.

The storage 318 provides non-volatile, bulk or long term storage of data or instructions in the computing device 300. The storage 318 may take the form of a disk, tape, CD, DVD, or other reasonably high capacity addressable or serial storage medium. Multiple storage devices may be provided or available to the computing device 300. Some of these storage devices may be external to the computing device 300, such as network storage or cloud-based storage.

The network interface 311 includes an interface to a network such as network 102 (FIG. 1).

The I/O interface 315 interfaces the processor 312 to peripherals (not shown) such as displays, keyboards and USB devices.

Figure 4:
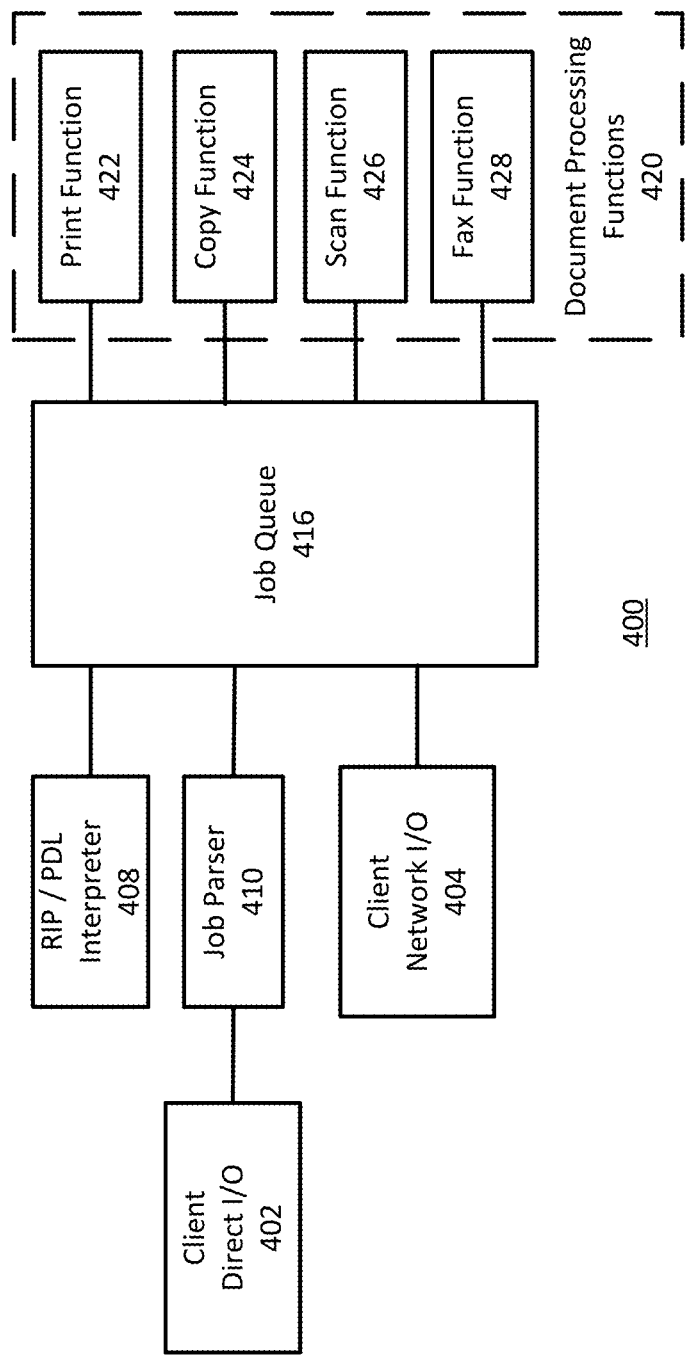
FIG. 4 is a block diagram of a software system for an MFP.

Turning now to FIG. 4 there is shown a block diagram of a software system 400 of an MFP, which may operate on the controller 210. The system 400 includes client direct I/O 402, client network I/O 404, a RIP/PDL interpreter 408, a job parser 410, a job queue 416, a series of document processing functions 420 including a print function 422, a copy function 424, a scan function 426 and a fax function 428.

The client direct I/O 402 and the client network I/O 404 provide input and output to the MFP controller. The client direct I/O 402 is for the user interface on the MFP (e.g., user interface subsystem 113), and the client network I/O 404 is for user interfaces over the network. This input and output may include documents for printing or faxing or parameters for MFP functions. In addition, the input and output may include control of other operations of the MFP. The network-based access via the client network I/O 404 may be accomplished using HTTP, FTP, UDP, electronic mail TELNET or other network communication protocols.

The RIP/PDL interpreter 408 transforms PDL-encoded documents received by the MFP into raster images or other forms suitable for use in MFP functions and output by the MFP. The RIP/PDL interpreter 408 processes the document and adds the resulting output to the job queue 416 to be output by the MFP. The RIP/PDL interpreter 408 may be limited to interpreting one or more pre-selected PDL types.

The job parser 410 interprets a received document and relays it to the job queue 416 for handling by the MFP. The job parser 410 may perform functions of interpreting data received so as to distinguish requests for operations from documents and operational parameters or other elements of a document processing request.

The job queue 416 stores a series of jobs for completion using the document processing functions 420. Various image forms, such as bitmap, page description language or vector format may be relayed to the job queue 416 from the scan function 426 for handling. The job queue 416 is a temporary repository for all document processing operations requested by a user, whether those operations are received via the job parser 410, the client direct I/O 402 or the client network I/O 404. The job queue 416 and associated software is responsible for determining the order in which print, copy, scan and facsimile functions are carried out. These may be executed in the order in which they are received, or may be influenced by the user, instructions received along with the various jobs or in other ways so as to be executed in different orders or in sequential or simultaneous steps. Information such as job control, status data, or electronic document data may be exchanged between the job queue 416 and users or external reporting systems.

The job queue 416 may also communicate with the job parser 410 in order to receive PDL files from the client direct I/O 402. The client direct I/O 402 may include printing, fax transmission or other input of a document for handling by the system 400.

The print function 422 enables the MFP to print documents and implements each of the various functions related to that process. These include stapling, collating, hole punching, and similar functions. The copy function 424 enables the MFP to perform copy operations and all related functions such as multiple copies, collating, 2 to 1 page copying or 1 to 2 page copying and similar functions. Similarly, the scan function 426 enables the MFP to scan and to perform all related functions such as shrinking scanned documents, storing the documents on a network or emailing those documents to an email address. The fax function 428 enables the MFP to perform facsimile operations and all related functions such as multiple number fax or auto-redial or network-enabled facsimile.

Some or all of the document processing functions 420 may be implemented on a client computer, such as a personal computer or thin client. The user interface for some or all document processing functions may be provided locally by the MFP's user interface subsystem though the document processing function is executed by a computing device separate from but associated with the MFP.

Figure 5:
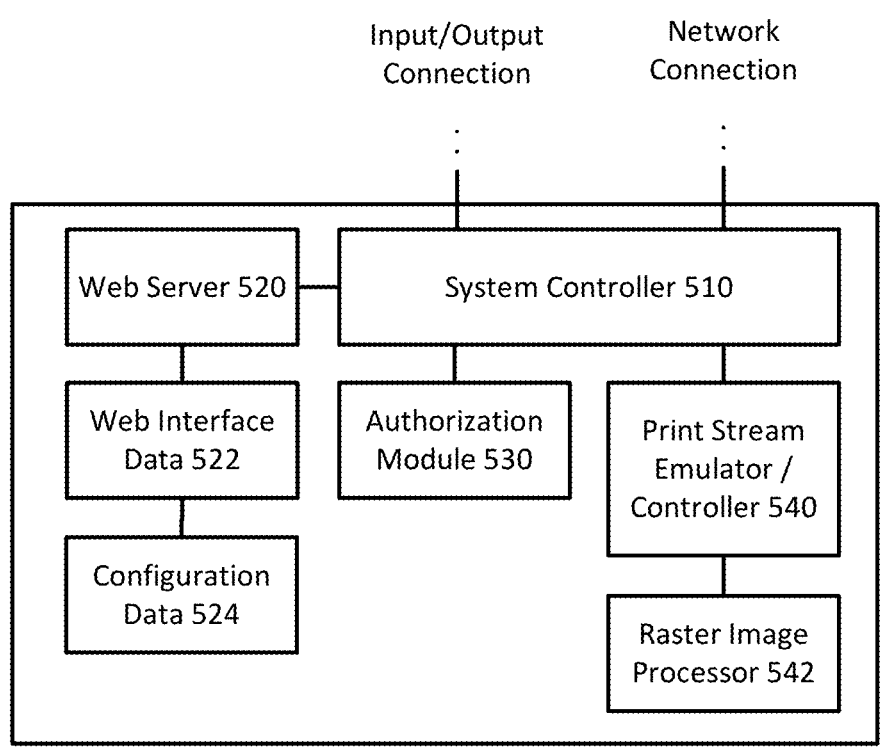
FIG. 5 is a block diagram of a software system for a converter peripheral.

Turning now to FIG. 5, a block diagram of a software system 500 for a converter peripheral is shown. The software system 500 includes a system controller 510, a web server 520, web interface data 522, configuration data 524, an authorization module 530, a print stream emulator/controller 540, and a raster image processor 542.

The system controller 510 is software operating on a computing device, such as computing device 200, that controls the operation of the converter peripheral. In particular, the system controller 510 emulates a printing device by accepting print jobs as though it is a printing device, converting those print jobs into a form usable by associated printing device(s), and then outputting those converted print jobs to the associated printing device(s). The system controller 510 relies on and controls communications with external devices and several subsidiary elements to accomplish this task, as described more fully below. The system controller 510 may, for example, listen on a specific network port for incoming print operations.

The web server 520 is software operating on a computing device for serving web pages and associated content to requesting web browser software over a network. The web server 520 here accesses storage storing web interface data 522 that serves to provide a web-based configuration interface for adjusting the configuration of the software system 500. For example, the web interface data 522 may include one or more web pages and associated content that enable a user of remote web browser software to alter the configuration data 524 used to configure the operation of the software system 500. As the configuration data 524 is updated, the system 500, and in particular, the system controller 510 operates differently.

The authorization module 530 is software operating on a computing device that ensures that the software system 500 is authorized to perform the conversion operation. The authorization module 530 may interact with a network connection and/or an input/output connection (such as a USB port) to confirm that the software system 500 is licensed. This may involve interacting with a printing device or may take place over a network directly. As will be described more fully below, a license key may be provided to the software system and may be confirmed to be valid before conversion operations are enabled.

The print stream emulator/controller 540 is software operating on a computing device that enables the software system 500 to accept electronic documents in one or more page description language (PDL) formats and to engage the raster image processor 542 to convert the electronic documents into another PDL format. For example, the set of PDL formats may include (1) portable document format (PDF), (2) extensible paper specification (XPS), (3) Joint Photographic Experts Group (JPEG) format, (4) tagged image file format (TIFF), (4) portable network graphics (PNG) format, (5) printer command language 6 (PCL 6), (6) printer command language 5 (PCL 5) and (7) PostScript. The resulting converted PDL may be, for example, in PCL XL format.

The raster image processor 542 is software operating on a computing device that generates print data in a form suitable for output by a printer by first generating a series of scan-lines along with associated page information for each page of a requested document. The document may then be re-formed into a new print stream, as though by a printer driver, based upon the scan-lines and associated page information. The resulting print stream may be in the new, converted format.

Figure 6:
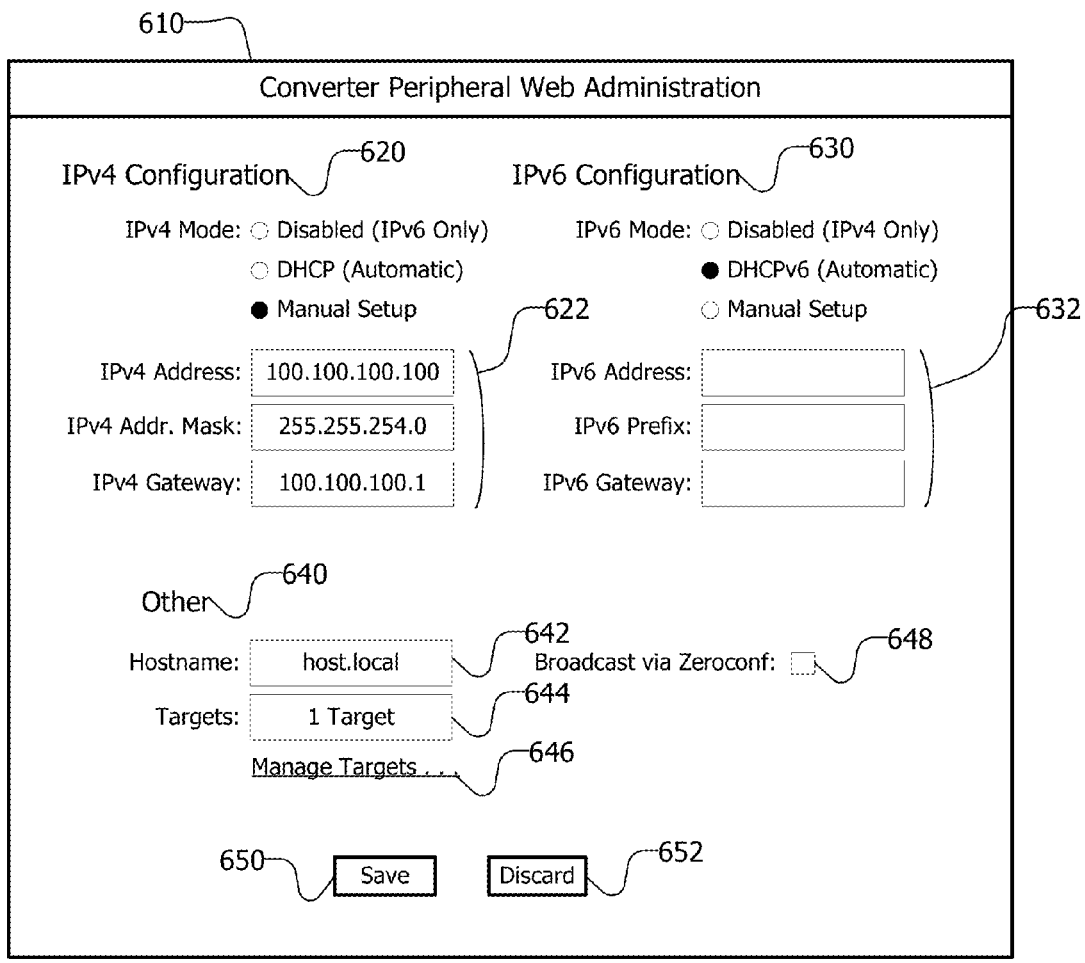
FIG. 6 is a web-based configuration interface for a converter peripheral.

FIG. 6 shows a web-based configuration interface 600 for a converter peripheral. The converter interface 600 may be made up of one or more hypertext markup language (HTML) web pages and may include a title 610, a IPv4 Configuration section 620, and IPv6 Configuration section 630, each with corresponding input fields 622 and 632. The converter interface may also include an Other section 640 with a hostname data field 642, a targets data field 644, a manage targets link 646 and a broadcast via zeroconf checkbox 648. A save button 650 and a discard button 652 are also included in the interface 600.

The IPv4 Configuration section 620 enables an administrator to select a mode of operation in an internet protocol version 4 (IPv4) mode and, if manual setup is selected, to use the input fields 622 to set forth the IPv4 address, the IPv4 address mask, and the IPv4 default gateway.

The IPv6 Configuration section 630 enables an administrator to select a mode of operation in an internet protocol version 6 (IPv6) mode and, if manual setup is selected, to use the input fields 632 to set forth the IPv6 address, the IPv6 address prefix length, and the IPv6 default gateway.

The Other section 640 may list the hostname of the associated converter peripheral in the hostname data field 642, and the target (or a number of targets) printing devices may be listed or identified in the targets data field 644. An administrator may alter the targets by interacting with the manage targets link 646. An administrator may enable or disable a broadcast of availability of the converter peripheral by selecting the broadcast via zeroconf checkbox 648.

The save button 650 enables an administrator to save the settings that have been updated or changed. The discard button 652 enables an administrator to discard all changes and revert to a pre-change configuration. Access to the web-based configuration interface 600 may be limited or controlled, for example, by a password or other authentication.

Figure 7:
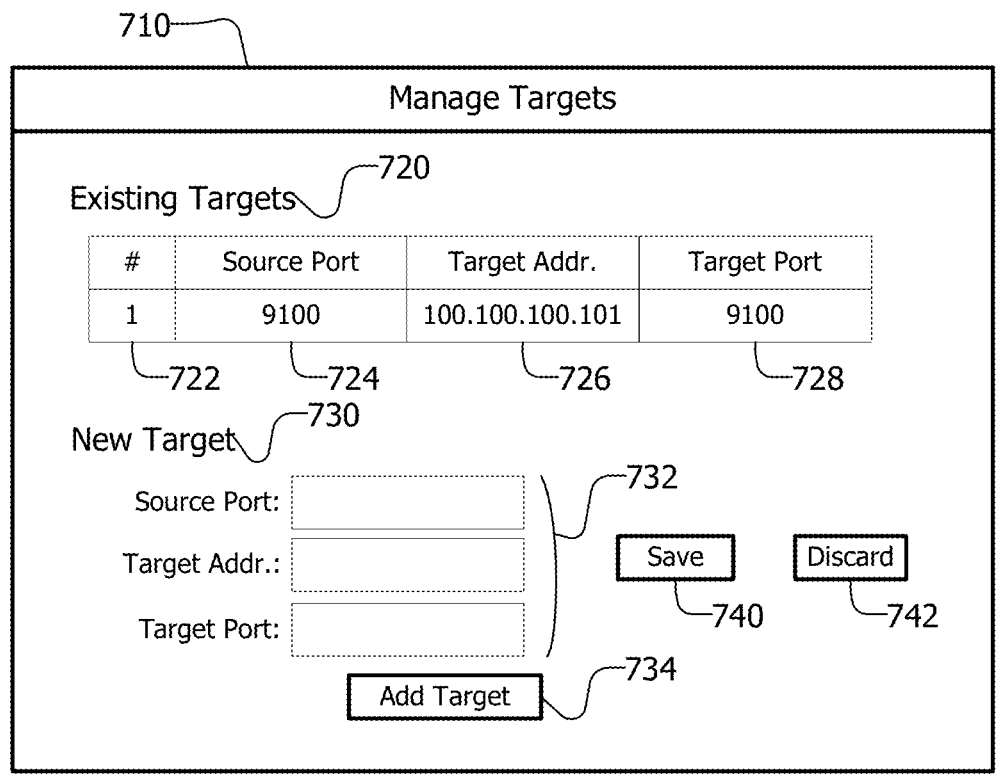
FIG. 7 is a sub-portion of a web-based configuration interface for a converter peripheral for managing target devices.

Referring to FIG. 7, a sub-portion 700 of a web-based configuration interface 600 for a converter peripheral for managing target devices is shown. The sub-portion 700 includes a title 710, an Existing Targets section 720, a New Target section 730, along with a save button 740, and a discard button 742.

The Existing Targets section 720 includes a target number 722, a source port 724, a target address 726 and a target port 728. The Existing targets section 720 may list all targets for a converter peripheral. In some cases, a single converter peripheral may target multiple printing devices. Each of these printing devices may include a target number 722, a source port 724, identifying a port on which data is received, a target address 726 to which converted electronic document data is transmitted, and a target port 728, identifying a part at the associated target address 726 to which the data is directed.

The New Target section 730 enables an administrator to add additional targets. The administrator may input data in the data fields 732 indicating a source port, a target address, and a target port. Once input, the administrator may select the add target button 734 to add the new target to the Existing Targets section 720.

The save button 740 enables an administrator to save the settings that have been updated or changed. The discard button 742 enables an administrator to discard all changes and revert to a pre-change configuration.

Description of Processes

Figure 8:
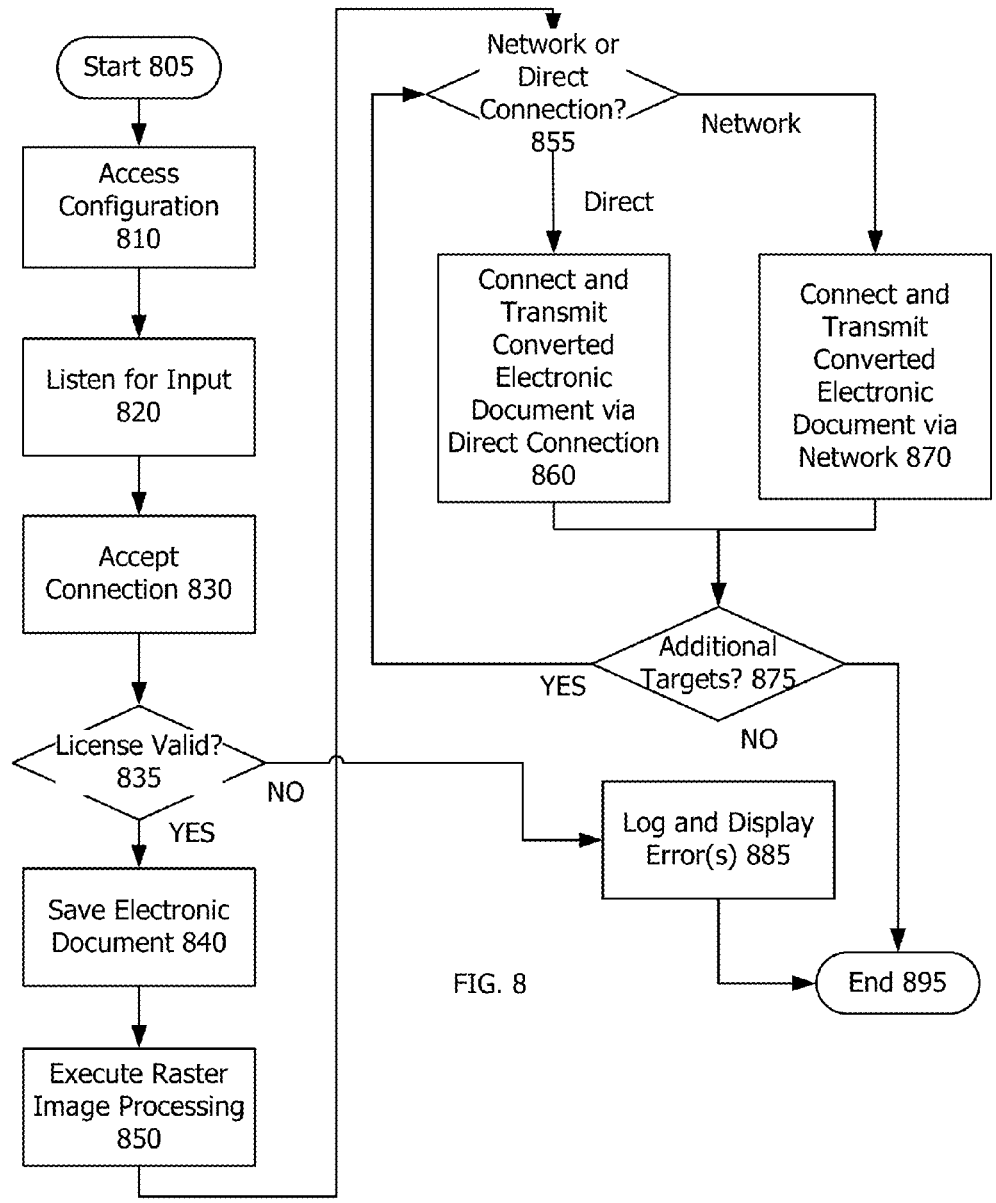
FIG. 8 is flowchart for a process of converting an electronic document for output by an MFP.

Turning to FIG. 8, a flowchart for a process of converting an electronic document for output by an MFP is shown. After start 805, the process begins with accessing the configuration at 810. This may be accessing the configuration data 524 (FIG. 5) that may or may not have been edited by an administrator. This editing may have included adding a target device, including the ports and associated IPv4 or IPv6 addresses.

After the configuration is accessed, the converter peripheral is enabled to listen for input at 820 pursuant to the configuration data. At this step, the converter peripheral, for example, listens on a particular port (as set by the configuration data) for incoming print requests.

Once a print request is available on the appropriate port, the connection is accepted at 830. At this point, the converter peripheral mimics the behavior of a printing device, accepting the print request.

Before the process continues, a determination is made whether the license for the converter peripheral is valid at 835. This step may take place only within the authorization module 530 to confirm that the license is valid. Alternatively, a remote server may be queried to confirm that a valid license key is stored on the converter peripheral. This may involve checking for a valid license key or may include comparing the license key (or a derivative thereof) with a license key on the remote server. This step may take place at every print request or may only take place once at the first operation or periodically, for example every few print requests or every thirty days.

If the license is valid ("yes" at 835), then the electronic document is saved at 840 so that the process of converting the electronic document may begin. This saving may be to a temporary storage location. If the license is not valid ("no" at 835), then the license error is logged, with a timestamp, and may be reported to the requestor of the print conversion. This reporting may be in the form of a popup on a computing device requesting the conversion operation or may be in the form of a document output on the printing device indicating that the requested conversion operation was not licensed. After the logging and reporting to the user at 885, then the process ends at 895.

Next, raster image processing on the saved electronic document is executed at 850. In this process the electronic document is converted into 1-bit halftoned data which is compressed using delta-row compression. Rasterised data for each page is converted to a series of 128 scan-lines buffers, together with page specific information including the paper size and media type. The raster image processing continues with the generation of a new PDL format data stream, such as a PCL XL data stream, by adding the PDL instruction operation codes wrapping the page data. The output converted electronic document is then saved for output. During this process at 850, the electronic document is effectively "printed" internally, then re-formatted into a different PDL format.

Next, a determination is made whether the connection to the associated printing device is direct or network at 855. A direct connection may be, for example, a universal serial bus (USB) cable connecting the converter peripheral to the printing device. This type of connection does not rely upon a network. If the connection is network, it may be, for example, a wireless or an Ethernet connection. As shown in FIGS. 6 and 7 above, these types of connections may be configured around specific IP addresses and ports.

Whatever the connection type, the converted electronic document, now in a form suitable for reading and outputting by the printing device, is transmitted to the printing device by the appropriate channel at 860 or 870.

Finally, a determination is made whether there are additional targets at 875. If there are additional targets ("yes" at 875), then the same determination whether the connection is to be made via a network or directly is made at 855. In this way, the same document may be output by several printing devices.

Alternatively, a single converter peripheral may be configured such that a print request sent to one printer (at a particular IP address and port combination) may be output at that printer, while a different print request sent to another printer (at a different IP address and port combination) may be output to the different printer. In this way, a single converter peripheral may serve a number of printing devices. The service may be transparent to a user who, may only know that he or she has requested printing of a particular document type at one printer or another and may be unaware that the same converter peripheral is first converting each of those print requests so that the requested printer will be capable of generating a physical document from the selected electronic document.

If there are no additional targets ("no" at 875), then the process ends at 895.

Figure 9:
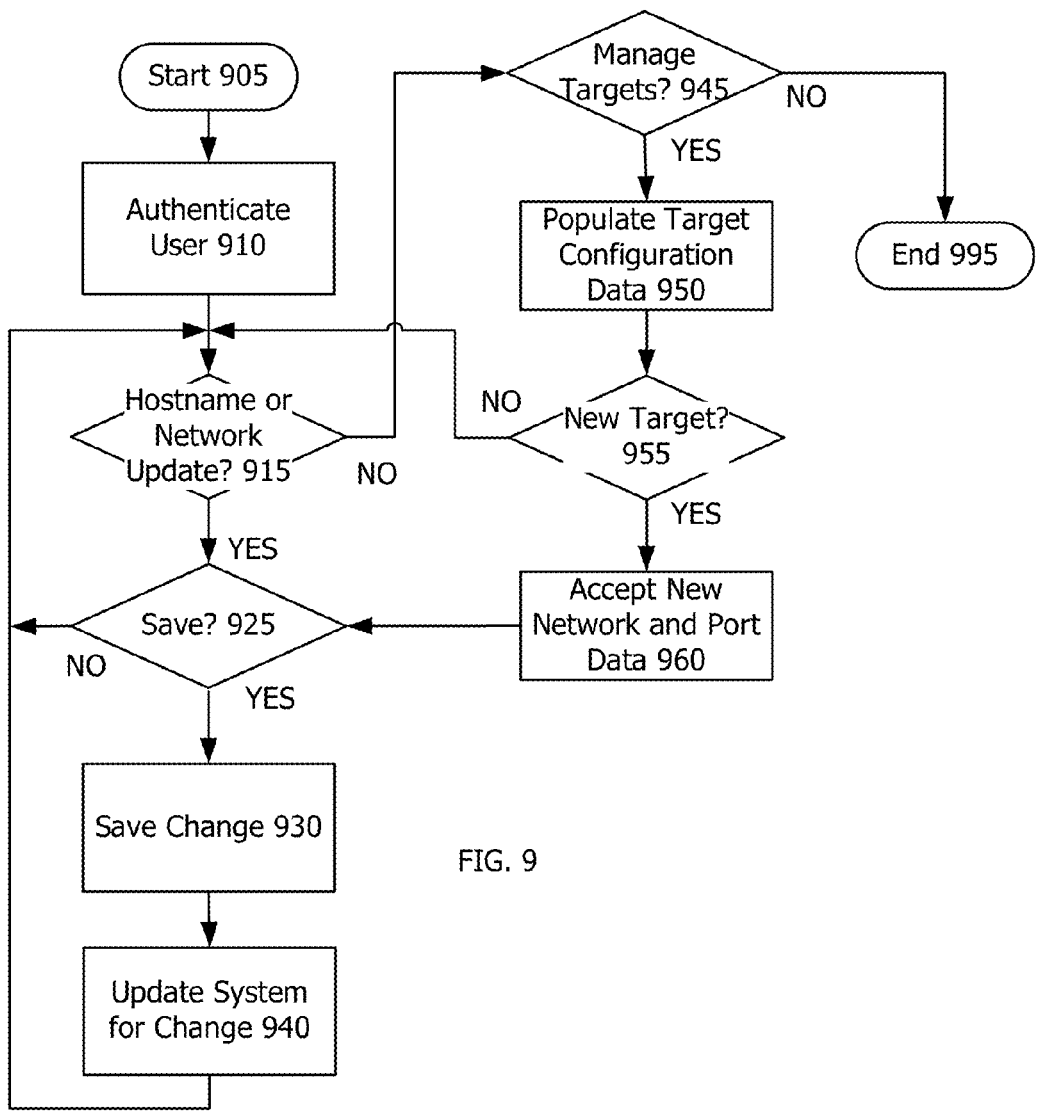
FIG. 9 is a flowchart for a process of converter peripheral network and target settings management.

FIG. 9 is a flowchart for a process of converter peripheral network and target settings management. The process begins, after start 905 with the authentication of a user at 910. This user may be required to login with a password or may merely need to know the appropriate IP address and port to which to address administrative requests. After authentication, the configuration interface, substantially similar to that shown in FIG. 6, may be shown to an administrator.

The process then awaits interaction indicating that a hostname or network has been updated at 915. If changes to either have been made ("yes" at 915), then a determination of whether to save those changes is made at 925. If not, the process reverts to a determination of whether there are other changes to the hostname or network at 915. If so ("yes" at 925), then the changes are saved at 930. The changes may then be applied to the system which is updated at 940. This update 940 may include restarting the converter peripheral.

If no hostname or network update is received at 915, then the process checks to see if management of targets has been requested at 945. If not ("no" at 945), then the process ends. If so, ("yes" at 945), then the configuration data involving current targets is populated at 950 for viewing by the administrator.

A determination is then made whether new target information is input at 955. If no ("no" at 955), then the process reverts to a determination of whether a hostname or network update is received at 915. If so ("yes" at 960), then the new network and port data is accepted at 960, and a determination whether to save that data is made at 925. The data may be saved at 930 and the converter peripheral updated at 940.

Once neither the hostname or network is updated at 915 and the targets are not being managed at 945, the process may end at 995. An affirmative step may cause this or a "timeout" after a predetermined time period of inactivity may cause the process to end at 995.

The process shown in FIG. 9 and described above relies upon a web-based configuration interface like that shown in FIGS. 5 and 6. However, the converter peripheral may be implemented as a series of processes by a computing device that may be more directly addressed. For example, the computing device may be a relatively low-power integrated computing device running a Unix-derivative or Linux-based operating system. As such, an administrator may login to the computing device and edit the underlying configuration data directly. The configuration data may be stored in a form, such as a text document, that is easily editable using well-known Unix or Linux document editors.

Figure 10:
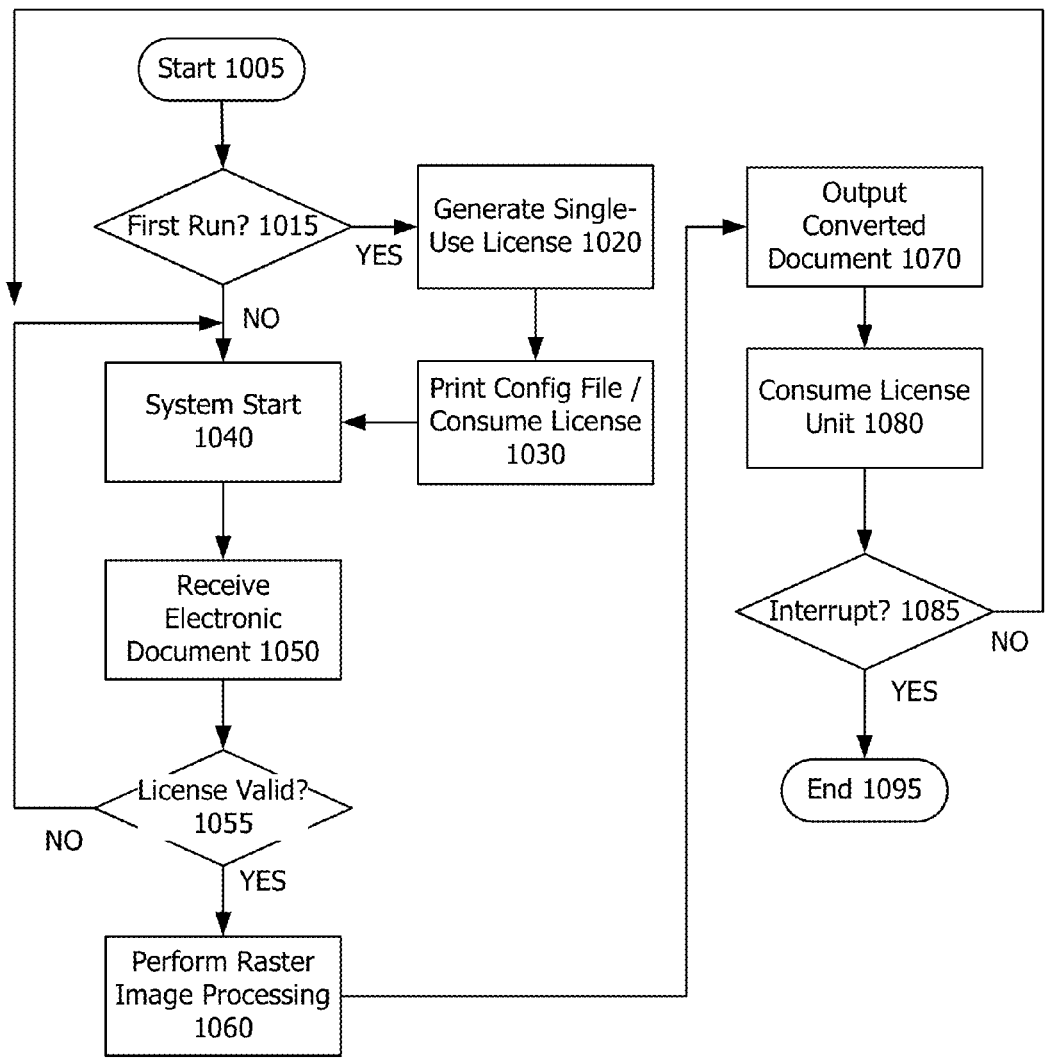
FIG. 10 is a flowchart for a process of license validation and electronic document conversion for a converter peripheral.

Referring to FIG. 10, a flowchart for a process of license validation and electronic document conversion for a converter peripheral is shown. The process begins after the start 1005 with a determination whether this is the first time the process has run at 1015.

If so ("yes" at 1015), then a single-use license is generated at 1020 and a configuration file detailing the way the system operates is printed and the single-use license is consumed at 1030. Licenses may be unlimited or may be on a per-page, per document or other, similar basis. When so designated, license units may be consumed and, eventually, run out or expire.

Additional license units may be purchased or otherwise obtained to re-enable the converter peripheral. Similarly, licenses may be specific to a particular converter peripheral or may be cross-device such that one license may be used on many converter peripherals or may be transferrable between converter peripherals.

If not ("no" at 1015) or afterwards, the system starts at 1040. As the system starts, the longer-term license can be created through user interaction using data provided by the configuration file (discussed in FIGS. 11 and 12, below).

Whenever an electronic document is received at 1050, a determination whether the license is valid is made at 1055. If not ("no" at 1055), then the process returns to the system start at 1040 to await further documents (or updating the configuration or license processes).

If so ("yes" at 1055), then raster image processing is performed at 1060 as described above. The resulting converted electronic document is output at 1070 and a license unit is consumed at 1080.

If no further interrupt is received ("no" at 1085), then the process returns to the start at 1040. If an interrupt is received ("yes" at 1085), then the process ends at 1095.

Figure 11:
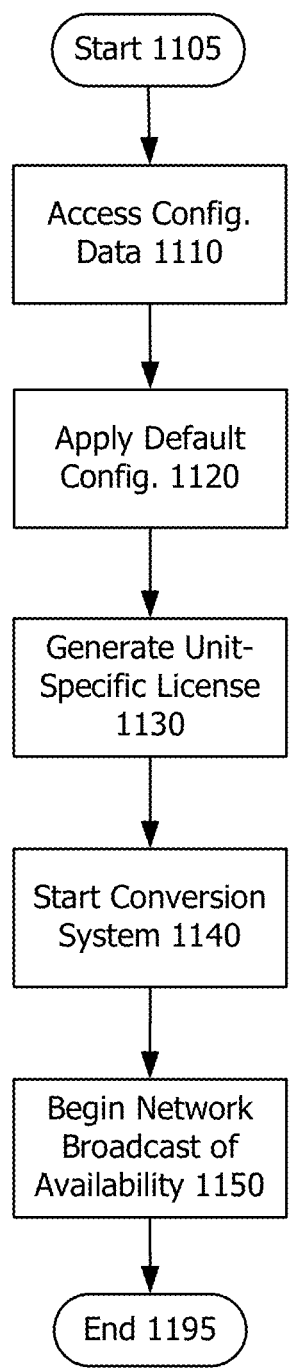
FIG. 11 is a flowchart for a process of initial license creation for a converter peripheral.

FIG. 11 is a flowchart for a process of initial license creation for a converter peripheral. This process may take place, for example, on the first system startup at 1040 (FIG. 10). The process may begin after start 1105 with accessing of a default configuration data at 1110. This default configuration may include network settings, an address and port at which the device may be reached and other, similar configuration settings.

Next, that default configuration data is applied to the converter peripheral at 1120. As a part of this process, then a converter peripheral unit-specific license is generated at 1130. This may specifically identify the converter peripheral by a serial number or other, unique identifier.

The converter peripheral system may then start at 1140. This may be, for example, a boot-up of the peripheral. Next, the converter peripheral may broadcast its availability at 1150 on a local network. Simultaneously, the converter peripheral may provide data pertaining to its unique license to a remote server for use in subsequent license confirmation before converting documents.

Once available at 1150, the converter peripheral operates until shut down or restarted and the license process ends at 1195.

Figure 12:
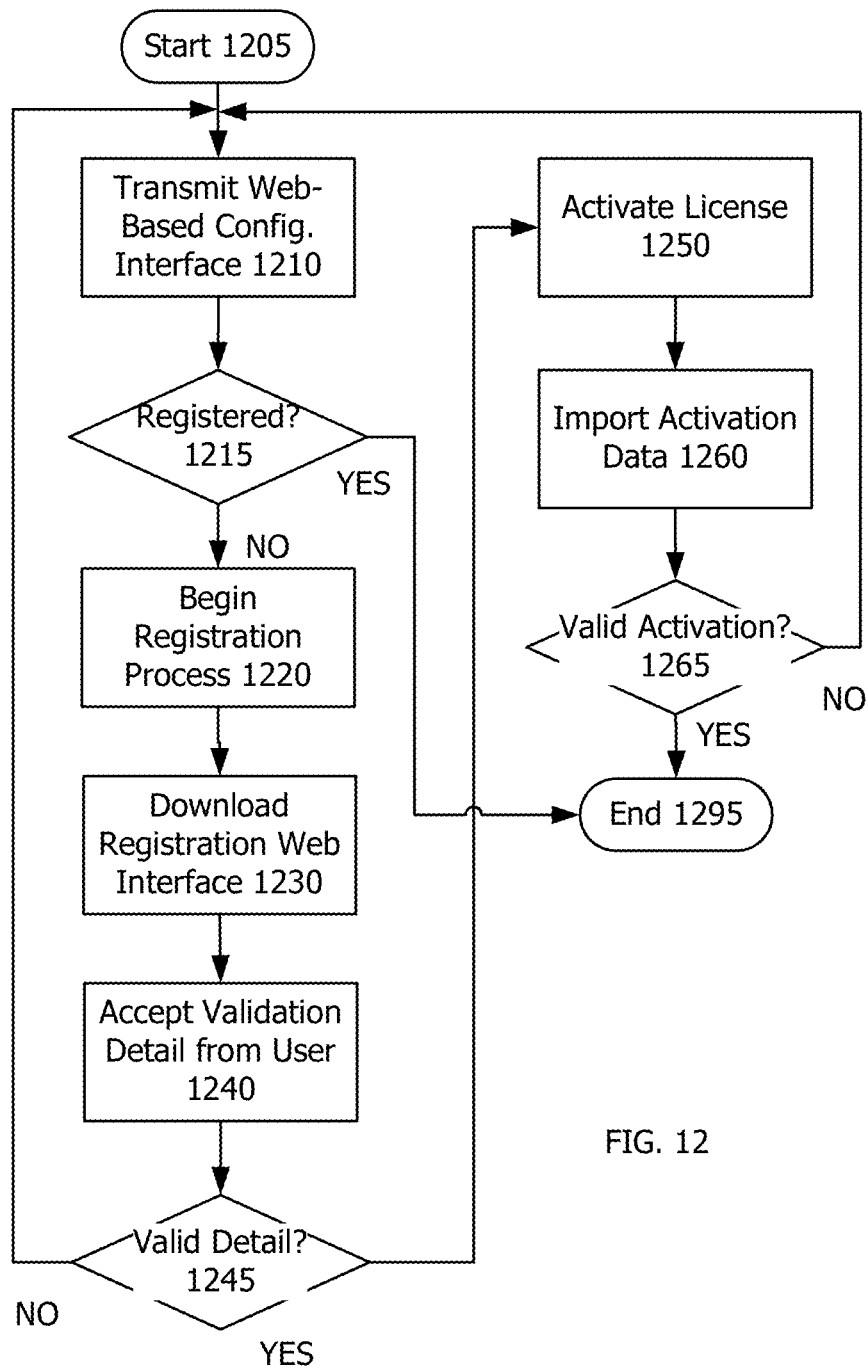
FIG. 12 is flowchart for a process of license activation for a converter peripheral.

Turning now to FIG. 12, a flowchart for a process of license activation for a converter peripheral is shown. This process may take place, for example, only on the first system startup at 1040 (FIG. 10) after the process shown in FIG. 11 or after a full system reset to default settings. The process begins after the start at 1205, with transmission of the web-base configuration interface 1210 to a web browser for display. This web-based configuration interface may take a form similar to that shown above in FIGS. 6 and 7.

Next, a determination is made at 1215 whether the converter peripheral is registered. If so ("yes" at 1215), then the converter peripheral is already licensed and the process ends at 1295. If not ("no" at 1215), then the registration process begins at 1220.

First, the registration web interface is downloaded by the converter peripheral at 1230. This interface may be used by an administrator to input settings related to license registration. These settings may be a license key, converter-peripheral-specific data and information pertaining to the licensor such as address, name, billing data and similar information.

The user may input validation detail at 1240, such as a serial number or another unique identifier provided by the converter peripheral or in documentation related to the converter peripheral. The validation detail may also include information pertaining to the licensee individual or entity, such as a name, address, billing information, email, phone number and other, similar, data. This data may be used to confirm that the converter peripheral is uniquely identified as associated with the resulting license that is generated.

At this stage, the converter peripheral may also access and compile data sufficient to generate a unique "fingerprint" of the converter peripheral. This data may include a CPU type or speed (of the converter peripheral CPU), a CPU serial number, a storage device type or size (of the converter peripheral), a storage device serial number, installed RAM, serial number of the converter peripheral itself, and various other unique characteristics. This data may make up a unique fingerprint for a particular converter peripheral. Together with the input validation detail, a license may be associated with a particular converter peripheral and with a specific licensee.

The process then confirms that the validation detail input at 1240 is correct at 1245. This may involve transmission of the validation detail to a remote server for confirmation. If the received validation detail is not correct ("no" at 1245), then the process returns to web-based configuration interface at 1210.

If the validation detail is correct ("yes" at 1245), then the license is activated at 1250 on the remote server. This results in the remote server being notified that the specific converter peripheral associated with the license is licensed to perform one or more conversion operations on incoming PDL documents.

The activation data 1260 is imported to the converter peripheral from the remote server. This activation data may be obtained from a remote server and may include a license key, license data, and/or checksum. This license data may be checked on subsequent conversion operations or may be cross-checked with the activated license on the remote server. The converter peripheral confirms that the activation was valid at 1265. This may involve attempting to convert and output a default document or merely interacting with the remote server to confirm.

The license data may also be encoded or encrypted, and may be stored in such a way that a username and/or password is required for access. Similarly, a checksum may be employed to confirm that license data remains unaltered. The encoding may be or include performing an exclusive or (XOR) bit-wise operation on each byte of the associated license data file(s) using each byte of an associated password or passphrase (or some derivative thereof). Encryption of various types may also be employed on the license data. In such cases, access to the license data may only be available after the license data is decrypted using information known only to the remote server.

If the activation (and associated license data) was valid ("yes" at 1265), then the process ends at 1295. If it was not, the process begins again with the web-based configuration interface at 1210.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method for using a converter peripheral to convert an electronic document for output by a multifunction peripheral comprising:

receiving the electronic document in a page description language unsupported by the multifunction peripheral;

determining that conversion of the electronic document by the converter peripheral is unlicensed;

generating a single-use license for the converter peripheral enabling the converter peripheral to output only the electronic document;

outputting, via the multifunction peripheral, a physical document including configuration data for the converter peripheral, thus consuming the single-use license;

accessing configuration data in order to determine at least one page description language supported by the multifunction peripheral;

accessing local license data to confirm authorization to perform a conversion;

converting the electronic document into a page description language supported by the multifunction peripheral;

transmitting the converted electronic document to the multifunction peripheral for output.

2. The method of claim 1 further comprising accessing remote license data on a remote server when the local license data is insufficient to confirm that the system is authorized to perform the conversion.

3. The method of claim 1 further comprising enabling configuration of the converter peripheral so as to configure settings related to the conversion of the electronic document using a web-based configuration interface accessed via a web browser.

4. The method of claim 3 further comprising:
transmitting the web-based configuration interface to a remote computing device;
receiving the configuration data generated through user interaction with the web-based configuration interface; and
in response to receipt of the configuration data, altering the configuration of the conversion processes undertaken by the converter peripheral.

5. The method of claim 1 further comprising:
receiving the converted electronic document; and
outputting the converted electronic document as a physical document.

6. The method of claim 1 wherein the electronic document is in a format other than printer command language XL (PCL XL) format and the converted electronic document is in printer command language XL (PCL XL) format.

7. The method of claim 1 wherein the converting the electronic document into a page description language supported by the multifunction peripheral includes converting the electronic document using a raster image processor (RIP) and outputting the converted electronic document as a series of scan-line buffers with PCL XL instruction codes appended.

8. A system for converting an electronic document for output by a multifunction peripheral comprising:
a converter peripheral comprising:
a network interface for receiving the electronic document, the electronic document in a page description language unsupported by the multifunction peripheral;
a processor for determining that conversion of the electronic document by the converter peripheral is unlicensed, generating a single-use license for the converter peripheral enabling the converter peripheral to output only the electronic document, and outputting, via the multifunction peripheral, a physical document including configuration data for the converter peripheral, thus consuming the single-use license;
the processor further for accessing configuration data in order to determine at least one page description language supported by the multifunction peripheral, for accessing local license data to confirm that the converter peripheral is authorized to perform a conversion, and for converting the electronic document into a page description language supported by the multifunction peripheral; and
an output interface for transmitting the converted electronic document to the multifunction peripheral for output.

9. The system of claim 8 wherein the processor is further for directing the network interface to access remote license data on a remote server when the local license data stored by the converter peripheral is insufficient to confirm that the system is authorized to perform the converting operation.

10. The system of claim 8 wherein the converter peripheral further comprises web server software and a web-based configuration interface for use by administrators in configuring so as to configure settings related to the converter peripheral by using a web browser to access the web-based configuration interface.

11. The system of claim 10 wherein the network interface is further for transmitting the web-based configuration interface to a remote computing device and for receiving the configuration data generated through user interaction with the web-based configuration interface, and in response, altering the configuration of the converter peripheral for converting the electronic document.

12. The system of claim 8 further comprising the multifunction peripheral, wherein the multifunction peripheral is for receiving the converted electronic document and for outputting the converted electronic document as a physical document.

13. The system of claim 8 wherein the electronic document is in a format other than printer command language XL (PCL XL) format and the converted electronic document is in printer command language XL (PCL XL) format.

14. A converter peripheral for converting an electronic document for output by a multifunction peripheral comprising:
a network interface for receiving the electronic document, the electronic document in a page description language unsupported by the multifunction peripheral;
a processor for determining that conversion of the electronic document by the converter peripheral is unlicensed, generating a single-use license for the converter peripheral enabling the converter peripheral to output only the electronic document, via the multifunction peripheral, a physical document including configuration data for the converter peripheral, thus consuming the single-use license;
the processor further for accessing configuration data in order to determine at least one page description language supported by the multifunction peripheral, for accessing local license data to confirm that the converter peripheral is authorized to perform a conversion, and for converting the electronic document into a page description language supported by the multifunction peripheral; and
an output interface for transmitting the converted electronic document to the multifunction peripheral for output.

15. The converter peripheral of claim 14 wherein the network interface is further for accessing remote license data on a remote server to confirm that the converter peripheral is authorized to perform the converting operation.

16. The converter peripheral of claim 14 wherein the converting the electronic document into a page description language supported by the multifunction peripheral includes converting the electronic document using a raster image processor (RIP) and outputting the converted electronic document as a series of scan-line buffers with PCL XL instruction codes appended.

17. The converter peripheral of claim 14 wherein the network interface is further for:
- transmitting a web-based configuration interface to a remote computing device; and
- receiving configuration data generated through user interaction with the web-based configuration interface that is thereafter used to alter the configuration settings related to the conversion of the electronic document by the converter peripheral.

18. The converter peripheral of claim 14 wherein the page description language unsupported by the multifunction peripheral includes one of: (1) portable document format (PDF), (2) extensible paper specification (XPS), (3) Joint Photographic Experts Group (JPEG) format, (4) tagged image file format (TIFF), (4) portable network graphics (PNG) format, (5) printer command language 6 (PCL 6), (6) printer command language 5 (PCL 5) and (7) PostScript.

\* \* \* \* \*